United States Patent [19]

Perrino et al.

[11] 4,271,729
[45] Jun. 9, 1981

[54] WIRE STRIPPING DEVICE

[75] Inventors: Joseph A. Perrino, Rehoboth, Mass.; Thomas W. Perrino, Johnston, R.I.

[73] Assignee: Micro Electronics, Inc., Newport, R.I.

[21] Appl. No.: 12,663

[22] Filed: Feb. 16, 1979

[51] Int. Cl.³ ............................................. H02G 1/12
[52] U.S. Cl. ................................................. 81/9.5 B
[58] Field of Search .......................... 81/9.5 B, 9.5 R; 30/90.1; 7/107, 132

[56] References Cited

U.S. PATENT DOCUMENTS

| 3,827,317 | 8/1974 | Perrino | 81/9.5 B |
| 4,108,028 | 8/1978 | Perrino | 81/9.5 B |

Primary Examiner—Othell M. Simpson
Assistant Examiner—Roscoe V. Parker
Attorney, Agent, or Firm—Salter & Michaelson

[57] ABSTRACT

A device for stripping insulation from the end of electrical wiring is disclosed and includes hand-held, elongated strip members that are pivotally movable to and from a wire stripping position, a tubular member extending between the grip members and guiding the wire to be stripped therethrough toward opposed blade members. The opposed blade members are removably secured in a block in which the grip members are also pivotally mounted, the blade members engaging the grip members so that upon pivotal movement of the grip members the blade members are moved in a corresponding lateral motion to sever the insulation of the wire that has been inserted into the tubular member and between the blade members. An adjustable stop and spring member engages the grip members for normally urging the grip members to an open position and further providing a stop for selective location of the wire to be stripped, thereby precisely determining the length of insulation to be stripped from the wire.

16 Claims, 16 Drawing Figures

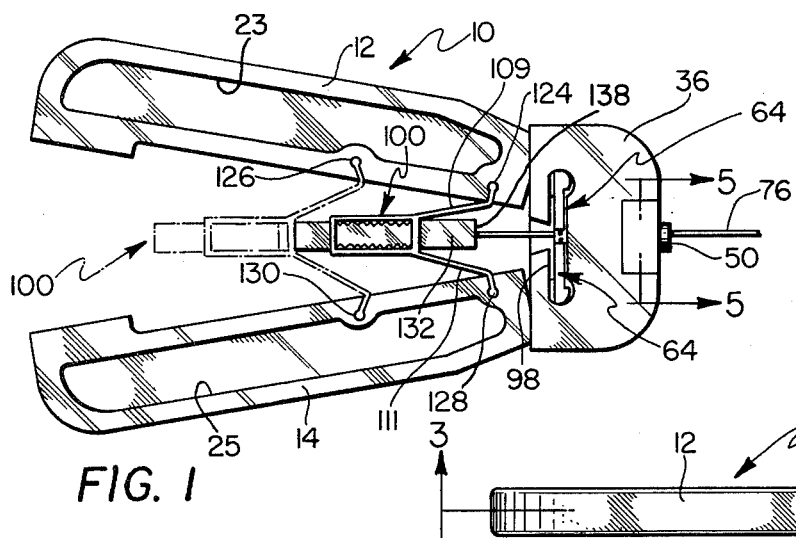
FIG. 1
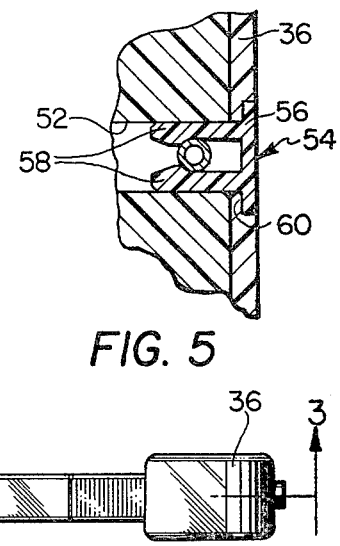
FIG. 5
FIG. 2
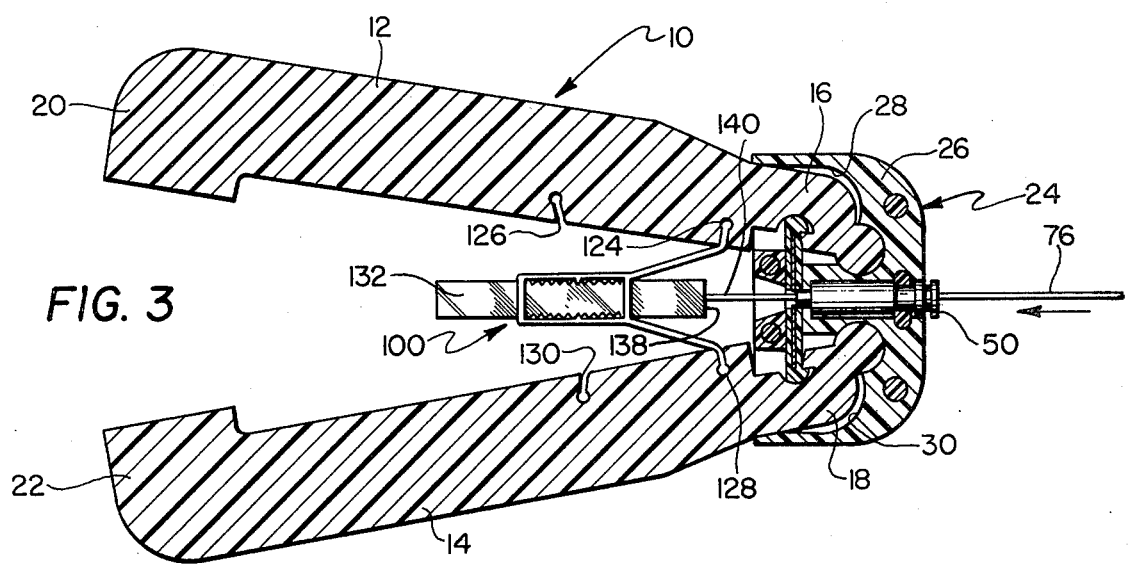
FIG. 3
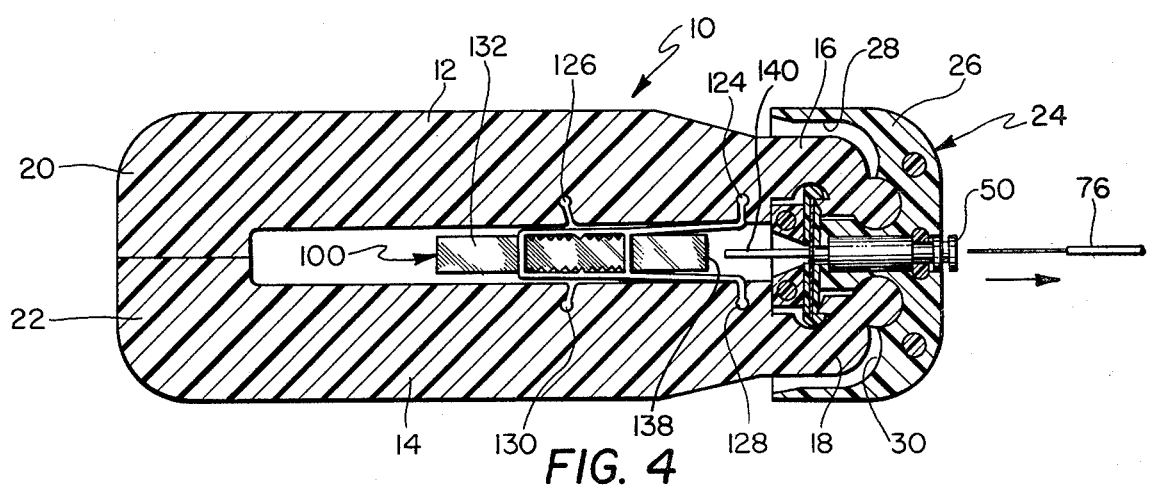
FIG. 4

WIRE STRIPPING DEVICE

BACKGROUND OF THE INVENTION

The present invention relates to a wire stripping device and has particular application as a portable hand-held device for use in stripping insulation from small diameter wire.

Wire stripping devices for use in the stripping of insulation from electrical wire are well known in the art, and over a period of time have taken various shapes and forms in the construction thereof. In the stripping of insulation from small diameter wire, many of the wire strippers known heretofore have not been altogether satisfactory because the cutting elements of these prior known devices quite frequently cut through the insulation and into the wire strands, thereby nicking the wire strands and impairing the conductivity characteristics thereof. In most of these prior known stripping devices, the depth of cut of the cutting elements was not precisely controlled; and, as a result, the user of the device had to gauge how deeply to cut into the insulation. Approximating the depth of cut of the cutting elements was not always accurate, and in the use of certain of the prior known devices nicking or cutting of the wire strands oftentimes resulted.

In U.S. Pat. Nos. 3,827,317 and 4,108,028, wire strippers are disclosed that represent improvements over the conventional wire stripping devices; and in U.S. Pat. No. 4,108,028, a specific form of blade member is disclosed that cooperates with the grip members of the wire stripping device for precisely controlling the depth of cut in the insulation of the wire being stripped, wherein nicking and/or cutting of the wire strands is prevented during the wire stripping operation. Although the wire stripping devices illustrated and disclosed in U.S. Pat. Nos. 3,827,317 and 4,108,028 perform a wire stripping operation in a satisfactory manner for the purpose disclosed and described therein, the present invention represents an improvement thereover, as will be described hereinafter.

SUMMARY OF THE INVENTION

The present invention relates to a device for stripping insulation from an end portion of a small diameter wire and is an improvement of the wire stripping device as illustrated and described in U.S. Pat. Nos. 3,827,317 and 4,108,028.

The wire stripping device as embodied in the present invention includes a pair of hand-held grip members that are pviotally mounted in an end block at one end thereof, the other ends of the grip members being normally urged apart by a spring member and being movable relative to each other to the closed stripping position against the action of the spring member. An elongated axially extending tubular guide projects through the block intermediate the grip members and receives therein in guiding relation the lead-in portion of a wire from which insulation is to be stripped. A pair of blade members are located in opposed relation in the block and include exposed blade elements for severing the insulation of the wire during a wire stripping operation, the blade members being disposed in perpendicular relation to the longitudinal axis of the guide and being engageable with the grip members for lateral movement relative to the longitudinal axis of the guide upon pivotal movement of the grip members to the closed stripping position. The blade elements are thus caused to penetrate into the wire insulation, whereafter a longitudinal retracting movement on the wire strips the insulation from the lead-in portion thereof.

One of the unique features of the present invention provides for forming the pivotal end of each of the grip members with a rounded projection, the block also being formed with circular-like recesses therein for receiving the projections, wherein the grip members are pivotally mounted in the block about said projections as the axes thereof.

Other features of the invention include a unique stop arrangement that cooperates with the spring member for locating the end of the wire to be stripped in a predetermined position, so that only a selected portion of the insulation is stripped from the wire during the stripping operation. Other features of the invention reside in the manner in which the blade members are formed, which results in a unique construction of the blade member so that it positively cooperates with the grip members for transverse movement during the wire stripping operation.

Accordingly, it is an object of the present invention to provide a hand-held wire stripping device that includes replaceable blade elements for penetrating the insulation of a wire so that a measured portion of the insulation can be effectively stripped from the wire.

Other objects, features and advantages of the invention will become apparent as the description thereof proceeds when considered in connection with the accompanying illustrative drawings.

DESCRIPTION OF THE DRAWINGS

In the drawings which illustrate the best mode presently contemplated for carrying out the present invention:

FIG. 1 is a side elevational view of the wire stripping device as embodied in the present invention and showing the grip members in the open position thereof;

FIG. 2 is a top plan view thereof;

FIG. 3 is a sectional view taken along line 3—3 in FIG. 2;

FIG. 4 is a sectional view similar to FIG. 3 but showing the grip members in the closed stripping position thereof;

FIG. 5 is a sectional view taken along line 5—5 in FIG. 1;

DESCRIPTION OF THE INVENTION

Figure 6:
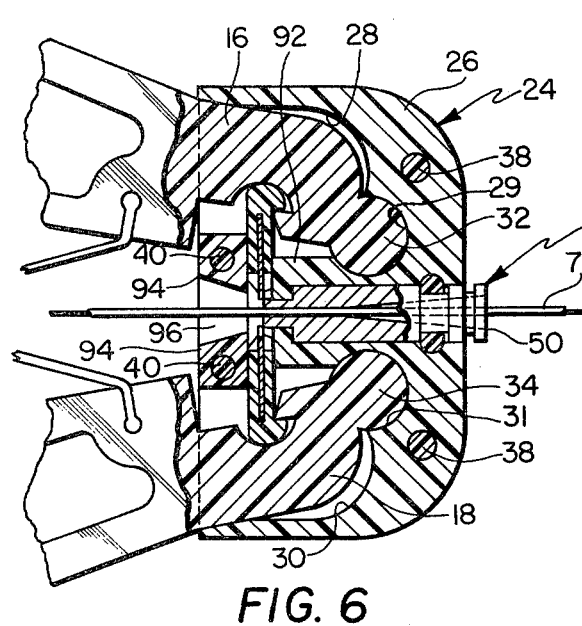
FIG. 6 is an enlarged fragmentary sectional view of the ends of the grip members as located in pivotal relation in the end block, the grip members being illustrated in the open position thereof.

Referring now to the drawings and particularly to FIG. 1, the wire stripping device embodied in the present invention is generally indicated at 10 and as illustrated is of the hand-held type that is designed to strip insulation from small diameter wire. The wire stripping device 10 includes substantially identically formed grip members 12 and 14 that are preferably molded of a durable plastic material and are generally elongated in shape and configuration; and, as illustrated in FIGS. 3 and 4, the grip members 12 and 14 include toe portions 16 and 18, respectively. Formed on the rearmost ends of the grip members are heel portions 20 and 22 that are movable toward and away from each other during the wire stripping operation as controlled by the hand of the user. Elongated recesses 23 and 25 are further formed in the grip members 12 and 14, respectively, and are provided to reduce the amount of material used in the molding of the grip members.

Referring now to FIGS. 3 and 6, the toe portions 16 and 18 of the grip members are shown being received in an end block generally indicated at 24, the end block 24 including a base 26 in which recesses 28 and 30 are formed, the configuration of the recesses 28 and 30 accommodating the toe portions 16 and 18, respectively, therein. Formed in the base 26 as continuations of the recesses 28 and 30, respectively, are circular-like recesses 29 and 31 that receive correspondingly shaped projections 32 and 34 that are joined to the grip members 12 and 14 at the innermost ends of the toe portions 16 and 18. Thus, the grip members 12 and 14 are pivotally mounted in the block 24 and are movable about the projections 32 and 34 as the axes thereof respectively. As shown in FIGS. 1 and 5, a cover plate 36 is mounted on the base 26 by means of mounting pins 38 that extend into appropriate openings formed in the base 26, thereby locking the toe portions 16 and 18 in pivotal relation in the block 24.

Figure 12:
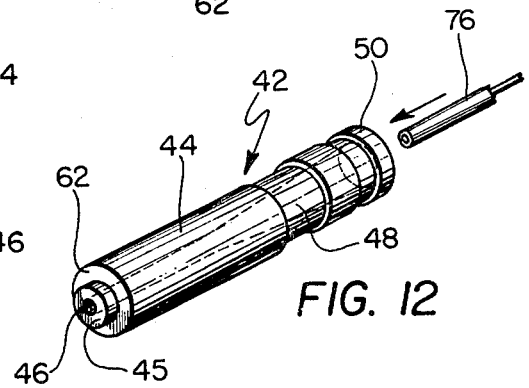
FIG. 12 is a perspective view of the tubular guide and showing an electrical wire prior to the insertion thereof through the axial opening in the guide.
Figure 13:
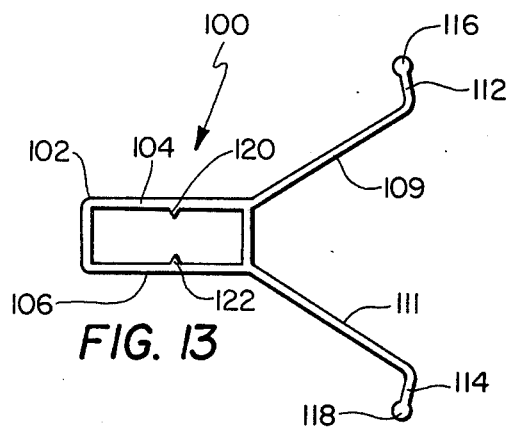
FIG. 13 is a top plan view of a strip member that is joined to the grip members for normally urging the grip members apart.
Figure 14:
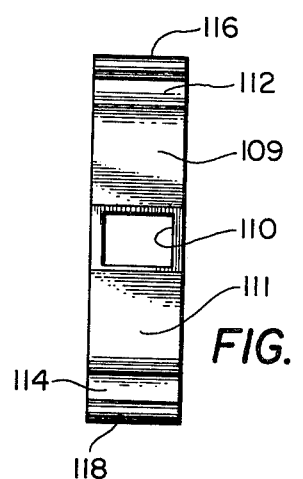
FIG. 14 is a rear elevational view thereof.
Figure 15:
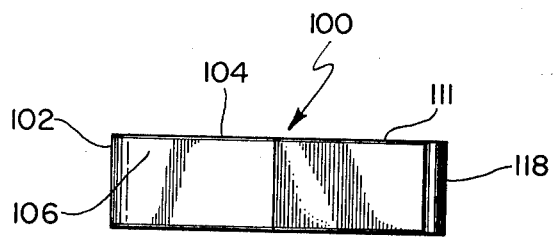
FIG. 15 is a top plan view thereof.

Formed axially in the base 26 of the block 24 is a bore that is dimensioned for receiving therein a tubular guide member generally indicated at 42. As shown more clearly in FIG. 2, the tubular guide member 42 includes a body portion 44 in which an axial bore 46 is formed that extends for the length thereof. The outermost portion of the bore 46 is tapered as shown in FIG. 6 to provide for a lead-in or entry for a wire to be stripped. Formed on the innermost end of the guide member 42 is a reduced projection 45 through which the bore 46 extends, the reduced projection 45 providing for alignment of the tubular guide with respect to blade members that are utilized during the wire stripping operation and that will be described more fully hereinafter. The tubular guide member 42 as further illustrated in FIGS. 6 and 12 includes a reduced portion 48 that is located adjacent to the outermost end thereof, the reduced portion 48 providing for locking of the guide member in place in the block 24, also as will be described hereinafter. Formed on the extreme rearmost end of the guide member 42 is an end flange 50 that defines a finger grip for extracting the guide member from the bore in the block 24 in which it is received.

As shown more clearly in FIG. 5, a through opening 52 is formed in the base 26 of the block 24 adjacent to the outer edge thereof, the opening 52 communicating with the reduced portion 48 of the guide member 42 when the guide member is located in place in the block. In order to lock the guide member in place in the block 24, a lock member generally indicated at 54 is provided and includes a head portion 56 to which spaced legs 58 are secured. Also formed in the cover plate 36 is an opening that is aligned with the opening 52 in the base 26, the head portion 56 of the lock member 54 being received in a recess 60 as formed in the cover plate 36. In this position the legs 58 of the lock member 54 project into the opening 52 of the base 26 and receive the reduced portion of the guide member 42 therebetween in frictional locking relation. In engaging the guide member, the lock member 54 further acts to urge the guide member 42 to the proper position of use. Thus, as the legs 58 of the lock member 42 are snapped around the reduced portion 48, the legs engage the inner shoulder thereof and urge the guide member 42 inwardly such that the inner face of the guide member indicated at 62 contacts an annular shoulder 63 formed in the base 26 as illustrated in FIGS. 7 and 8.

Figure 7:
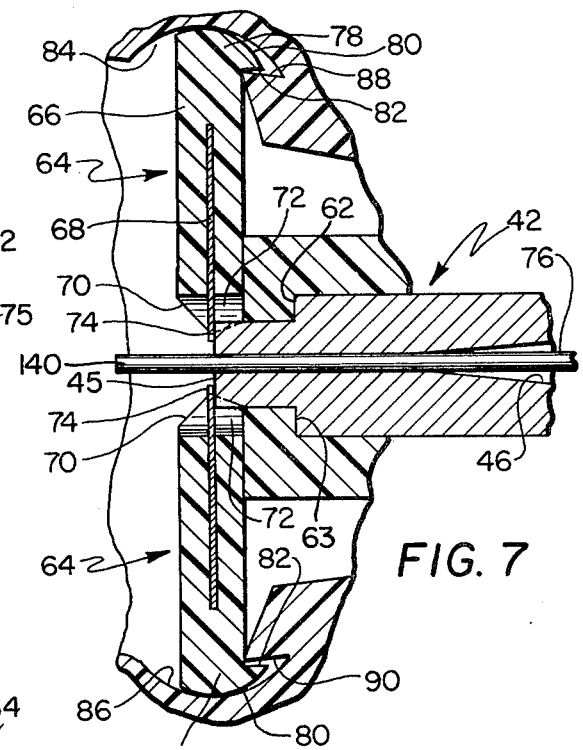
FIG. 7 is an enlarged fragmentary sectional view showing the position of the tubular guide relative to the blade members just prior to the stripping operation.
Figure 8:
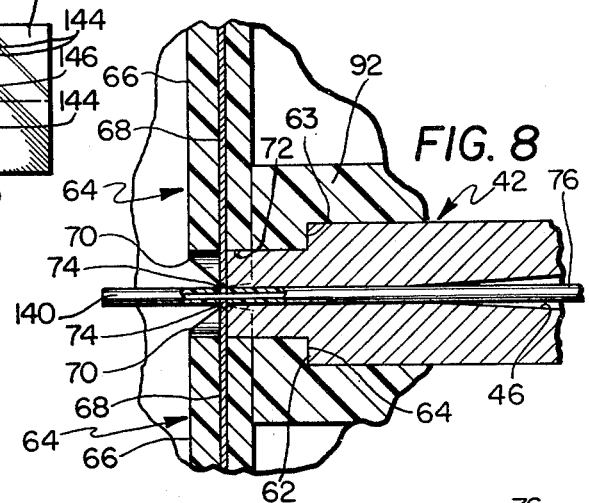
FIG. 8 is an enlarged fragmentary sectional view similar to FIG. 7 but showing the blade members after movement thereof to the closed stripping position.

In order to perform the wire stripping operation, the blade members generally indicated at 64 are provided, and as illustrated in FIGS. 6 and 7, the blade members 64 are disposed in interlocking engagement with the toe portions 16 and 18 of the grip member 12 and 14 so as to be transversely movable upon pivotal movement of the grip members. As shown more clearly in FIG. 7 and referring also to FIG. 11, each of the blade members 64 includes a molded body portion 66 in which a blade element 68 is encapsulated. The opposite sides of the innermost end of the body portion 66 of each blade member are formed with opposed notches 70 and 72, respectively, the conformation of the notch 72 corresponding to that of the reduced projection 45 as formed on the innermost end of the guide member 42. The notches 72 thus engage the reduced projection 45 when the insulation of the wire to be stripped is penetrated by the blade elements 68 during the stripping operation. As shown in FIG. 7, the blade element 68 of each blade member 64 projects outwardly of the body portion 66 and terminates in a small semi-circular notch 74 the notches 74 as formed in the opposed blade elements cooperating when moved into engagement with the insulation of a wire to be stripped to define an opening, the diameter of which is slightly larger than the wire.

During the wire stripping operation, the blade members 64 are moved transversely inwardly for engagement with insulation 76 of a wire to be stripped indicated at 75, and for this purpose the blade members 64 are formed with enlarged outer ends 78, each of the outer ends 78 having an outer curved surface 80 that extends beyond the adjacent face of the body portion 66 to terminate in a shoulder 82. In order to accommodate the enlarged portion 78 of the blade members 64, both the toe portions 16 and 18 of the grip members 12 and 14 are formed with generally rounded recesses 84 and 86, respectively, the recesses 84 and 86 having internal shoulders 88 and 90 formed thereon. It is seen that the enlarged portions 78 of the blade members 64 are captured in the recesses 84 and 86 of the grip members, the shoulders 82 engaging the shoulders 88 and 90 of the grip members 12, 14, respectively, so that upon pivotal movement of the grip members, the blade members 64 are moved in a corresponding lateral or transverse direction toward the wire to be stripped, whereupon the blade elements 68 are caused to penetrate the insulation 76 of the wire 75. As further illustrated in FIG. 6, the lateral or transverse movement of the blade members 64 is facilitated by location of the blade members in sliding engagement with a central portion 92 of the block 24 that is formed as an integral part of the base 26 of the block and through which the guide member 42 extends. Spaced from the central portion 92 are abutments 94 also formed as an integral part of the base 26 and that cooperate with the central portion 92 to define spaces therebetween for receiving the blade members 64 in sliding relation therein. Thus, the innermost face of the central portion 92 and the adjacent faces of the abutments 94 define bearing surfaces for engaging the walls of the blade members 64 as they are slidably moved to and from the stripping position. As further illustrated in FIG. 6, the walls of the abutments 94 that face each other are inclined so that a tapered space 96 is defined through which the innermost end of the wire to be stripped extends. As also shown in FIG. 6, the pins 40 for mounting the cover plate 36 on the base 26 extend into appropriate holes formed in the abutments 94, the pins 40 thus frictionally engaging the holes in the abutments 94 for securing the cover plate 36 in place.

One of the novel features of the invention is the quick and easy replacement of the blade members 64 from their assembled position without removal of the cover plate 36 from its assembled position on the base 26 of the block 24. It is understood that the cutting edges of the blade elements 68 as defined by the notches 74 thereof are prone to wear after the stripping operation has been carried out for a number of stripping operations. Thus, it is desirable to easily replace the blade members 64 without the requirement of special tooling. For this purpose the cover plate 36 of the block 24 is formed with an elongated, transversely extending slot 98 which overlies the blade members 64 and generally corresponds to the configuration thereof as located in their assembled position of use. The extreme ends of the slot 98 are also enlarged in generally the same conformation as the enlarged portions 78 of the blade members, whereby the blade members 64 are completely exposed through the slot 98. When it is desired to replace the blade members 64, the locking element 54 is removed from engagement with the tubular guide member 42, to release the guide member from its locked position in the axial bore as formed in the block 24. Thereafter, the tubular guide is retracted slightly to remove the projection 45 from engagement with the notches 72 of the blade members. A pin is then inserted through openings (not shown) that are formed on the underside of the base 26 of the block 24 and that have communication with the blade members 64. Each of the blade members is then pushed by the pin upwardly through the slot 98 for extraction from the assembled position in the block 24. New blades are then inserted through the slot in the cover plate 36 in the proper position, the enlarged portion 78 of the replacement blade members being received in the rounded recesses 84 and 86 of the grip members as illustrated in FIG. 7. The tubular guide 42 is then moved inwardly until the reduced projection 45 is again engaged with the notches 72 of the blade members, whereafter the lock element 54 is returned to the locking position as illustrated in FIG. 5.

In the normal position of the grip members 12 and 14 as illustrated in FIGS. 1 and 3, the grip members are retained in the outer pivoted position by a spring member generally indicated at 100. Referring to FIGS. 13 through 16, the spring member 100 is shown in more detail, and as illustrated includes a body portion 102 that is generally hollow in configuration, the body portion 102 having solid walls 104 and 106 and end walls formed with aligned square-shaped openings 108 and 110. Joined to the side walls 104 and 106 and extending angularly and forwardly thereof are arms 109 and 111, the arms 109 and 111 having outer portions 112 and 114 joined thereto in angular relationship and terminating in spherical portions 116 and 118. Formed on the inner surfaces of the walls 104 and 106 are opposed projections 120 and 122, the purpose of which will be described hereinafter.

As illustrated in FIGS. 1, 3 and 4, the inner peripheral portions of the grip members 12 and 14 are formed with slots 124, 126 and 128, 130, the configuration of the slots corresponding to the portions 112, 114 and spherical portions 116 and 118 of the spring member 100. With the spherical portions 116 and 118 located in the appropriate slots 124 and 128 as illustrated in FIG. 1, the body portion 102 is disposed intermediate the grip members 12 and 14, and the arms 109 and 111 normally urge the grip members apart in the open position as shown in FIGS. 1 and 3. During the stripping operation, the grip members 12 and 14 are pivotally moved to the closed position, as shown in FIG. 4, against the action of the spring arms 109 and 111; and upon release of the grip members following a stripping operation, the spring arms 109 and 111 urge the grip members 12 and 14 apart to the outer or open position.

Figure 16:
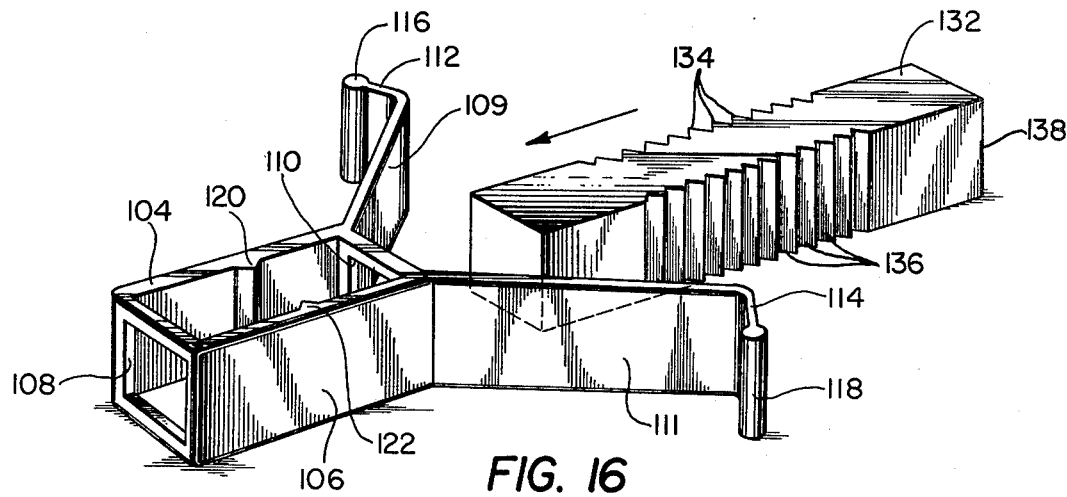
FIG. 16 is an exploded perspective view of the spring member and a stop member for the wire prior to the insertion of the stop member into the body portion of the spring member.

Another novel feature embodied in the present invention is the provision of an adjustable stop for selectively determining the length of insulation 76 to be stripped from the wire 75. For this purpose, an adjustable stop member 132 is provided, and as shown in FIG. 16 is formed in an elongated configuration, the cross-sectional shape of which corresponds to the openings 108 and 110 as formed in the body portion 102 of the spring member 100. Formed on the side walls of the stop member 132 are a plurality of notches 134 and 136, the configurations of which are designed to receive the projections 120 and 122 respectively therein. With the stop member 132 mounted in the body portion 102, the endmost wall of stop member 132 indicated at 138 defines a stop for receiving forwardmost end of the wire to be stripped in engagement therewith, the location of the wall 138 thus establishing the length of insulation to be stripped from the wire. It is seen that the stop member 132 may be adjusted axially relative to the blade members 64 by movement of the stop member within the body portion 102. In the adjustment, the projections 120, 122 ratchet over the notches 134, 136 until the desired position of the stop member 132 is obtained, the stop member being positively retained in the selected position of adjustment.

As shown in FIGS. 1, 3 and 4, the spring arms 109 and 111 are located such that the spherical portions 116 and 118 thereof are received in the slots 124 and 128 as formed in the grip members. In this position, the stop member 132 is adjustable to a variety of locations depending upon the length of the insulation 76 to be stripped from the wire 75. If for any reason it is necessary to provide for stripping of a longer portion of the insulation from the wire, the spring member 100 is relocated with the spring arms 109 and 111 disposed in the slots 126 and 130, respectively. Since the body portion 102 has been shifted more rearwardly of the blade members in the relocated position, the stop member 132 is spaced further apart from the blade members which provides for greater lengths of insulation to be stripped from the wire. Additional adjustments of the stop member 132 relative to the blade members 64 are also available by longitudinal movement of the stop member within the body portion 102.

The unique configuration and arrangement of the spring member 100 and the stop member 132 as mounted therein also provides for simple removal of the stripped material from the device following the stripping operation. Referring now to FIGS. 3 and 4, the wire 75 is shown in the wire stripping position, wherein the innermost end thereof is engaged with the end wall 138 of the stop member 132. The wire 75 is thus located in that position wherein the stripping of the insulation 76 thereof can be accomplished. In order to strip the insulation 76 from the wire 75, the grip members 12 and 14 are pivotally moved to the closed position as illustrated in FIG. 4, the blade members 64 being moved laterally inwardly to cause the cutting edges thereof as defined by the notches 74 to penetrate the insulation 76 of the wire. The user then pulls outwardly on the wire; and since the insulation 76 has been cut, the portion of the insulation that extends from the blade members 64 to the stop member 132 is stripped from the wire. Normally the portion of the insulation that is stripped from the wire remains in place following the stripping operation. However, in the present invention, when the grip members 12 and 14 are moved to the stripping position as illustrated in FIG. 4, the configuration of the spring arms 109 and 111 of the spring member 100 causes the body portion 102 and the stop member 132 carried thereby to retract from the position shown in FIG. 3 to that position illustrated in FIG. 4. Since the end portion of the insulation 76 indicated at 140 that has been stripped from the wire no longer contacts the stop wall 138, the stripped insulation 140 is then free to drop outwardly of the stripping device. With the stripped wire removed from the stripping device, the disengagement of the stripped insulation 140 from between the blade members and the stop member provides for automatic clearing of the stripping device for the next stripping operation.

Figure 9:
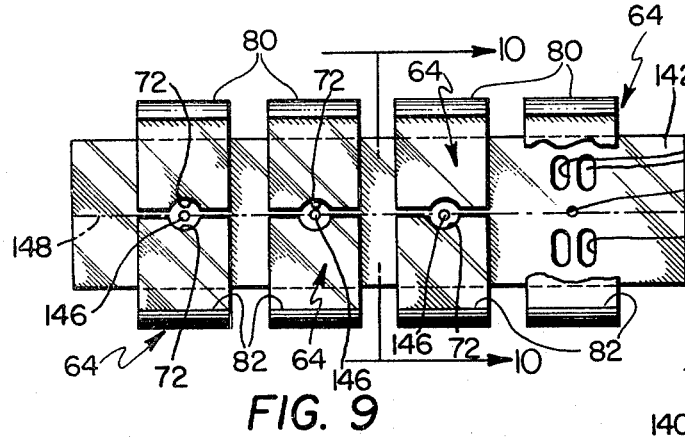
FIG. 9 is a top plan view with portions broken away of an elongated strip of blade material and showing the formation of pairs of joined blade members that are utilized in the wire stripping device and prior to the separation thereof.
Figure 10:
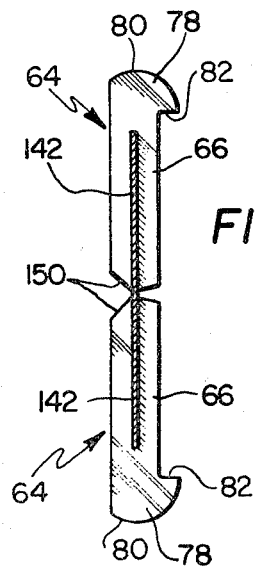
FIG. 10 is a sectional view taken along line 10—10 in FIG. 9.
Figure 11:
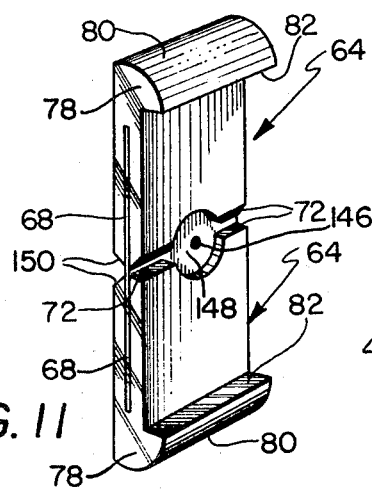
FIG. 11 is a perspective view of a pair of joined blade members as cut from the strip illustrated in FIG. 9 and prior to the separation thereof into the individual blade members.

Since the blade members 64 must be formed in a precise manner so that the notches 74 as formed therein cooperate to produce the required penetration of the insulation 76 of the wire without nicking or scoring the wire, it is necessary to form the blade members 64 in a manner that insures the complementary relationship of the notches 74. Referring now to FIGS. 9, 10 and 11, the steps illustrating the formation of the blade members 64 are shown, and referring particularly to FIG. 9, an elongated strip 142 of the blade material is illustrated and initially, the strip 142 is die cut with a plurality of openings 144 as formed in groups. The openings 144 are provided for adhering of the body portion 66 of the blade member when the blade member is formed during a mold operation. Punched out intermediate the groups of openings 144 and centrally of the strip 142 in spaced relation are a plurality of small diameter openings 146, the diameter of which is predetermined in accordance with the wire to be stripped. Since the blade members 64 are formed in pairs as illustrated in FIGS. 9, 10 and 11, some provision must be made for separating the individual blade members as initially molded from each other. This is accomplished by scoring the strip 142 as indicated by the score line 148 that extends centrally of the strip. The scoring operation for locating the score line 148 in the strip is accomplished prior to the blanking of the openings 144 and punching of the holes 146 in the strip.

With the score line 148 and the openings 144 and 146 formed in the strip 142, the strip is then placed in an appropriate mold and the blade members 64 are molded in spaced pairs around the strip 142, the plastic material encapsulating the strip to form the blade members in spaced pairs as shown in FIG. 10. During the molding operation, the edges of the blade members located in adjacent relation are formed with the rounded notches 70 and 72, the notches 72 being illustrated more clearly in FIGS. 9 and 11. The adjacent blade members as molded together around the strip 142 are further formed with an angular wall 150 that enables the blade members to be separated by breaking along the score line 148 as will be described hereinafter. The opposite wall of the blade members 64 is also separated to expose the score line 148 and to enable the blade members 64 to be conveniently separated from each other.

After the blade members 64 have been molded around the strip 142, the assembly is placed in another suitable device that strips away the molded blade members from the surplus metal material of the strip 142, the resulting blade members taking the form as illustrated in FIG. 11. Thereafter, the blade members 64 as joined together are separated by bending the joined blade members along the score line 148. Since the individual blade members as separated include a notch 74 as formed in the blade elements 68 thereof, it is seen that when the blade members are moved to the stripping position the notches 74 in the opposed blade members cooperate to precisely form the required opening to provide for the severing or penetration of the insulation 76 of the wire without nicking or scoring the wire 75.

It is also contemplated to form the openings 146 in the molded pairs of blade members 64 following the formation of the blade members to the configuration as illustrated in FIG. 11. In this event, the coupled blade members are placed beneath a suitable punching device, and the hole 146 is formed centrally of the blade members 64 as illustrated.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A device for stripping insulation from relatively small diameter electrical wire, comprising a pair of hand-held elongated grip members, a block for pivotally mounting said grip members at one end thereof, the other ends of said grip members being movable relative to each other to and from a closed stripping position, an elongated axially extending tubular guide located in said block intermediate said grip members and receiving therein in guiding relation the lead-in portion of a wire from which insulation is to be stripped, a pair of blade members located in opposed relation in said block and including exposed blade elements for severing the insulation of said wire during a wire stripping operation, said blade members being disposed in perpendicular relation to the longitudinal axis of said guide and being movable by said grip members for lateral movement relative to the longitudinal axis of said guide upon pivotal movement of said grip members to the closed stripping position, wherein said blade elements penetrate into the wire insulation, and whereafter a longitudinal retracting movement of said wire strips the insulation from the lead-in portion thereof, said block including a base, a cover plate removably mounted on said base for enclosing the pivotal ends of said grip members in said block, said cover plate having an elongated, transversely extending opening formed therein that overlies said blade members, whereby said blade members are removable from said block through said opening for replacement thereof.

2. A device for stripping insulation from relatively small diameter electrical wire, comprising a pair of hand-held, elongated grip members, a block for pivotally mounting said grip members at an end thereof, the other ends of said grip members being movable relative to each other to and from a closed stripping position, an elongated axially extending tubular guide located in said block intermediate said grip members and receiving therein in guiding relation the lead-in portion of a wire from which insulation is to be stripped, said block being formed with spaced apart portions that are located adjacent to said tubular guide and that define spaced and aligned laterally extending recesses in said block, a pair of individually positioned blade members located in opposed relation in said recesses in said block, each blade member including an exposed blade element for severing the insulation of said wire during a wire stripping operation, said blade members being disposed in perpendicular relation to the longitudinal axis of said guide and being engageable with said grip members, the engagement of said blade members with said grip members being such that upon pivotal movement of said grip members, said blade members are laterally shifted in a straight line and in a plane perpendicular to the axes of said guide and said wire extending therethrough, wherein said blade elements penetrate into the wire insulation, whereupon a longitudinal retracting movement of said wire strips the insulation from the lead-in portion thereof.

3. A device for stripping insulation from relatively small diameter electrical wire, comprising a pair of hand-held, elongated grip members, a block for pivotally mounting said grip members at an end thereof, the other ends of said grip members being movable relative to each other to and from a closed stripping position, an elongated axially extending tubular guide located in said block intermediate said grip members and receiving therein in guiding relation the lead-in portion of a wire from which insulation is to be stripped, a pair of individually positioned blade members located in opposed relation in said block, each blade member including an exposed blade element for severing the insulation of said wire during a wire stripping operation, said blade members being engageable with said grip members so that upon pivotal movement of said grip members said blade elements are moved into penetrating engagement with the insulation of said wire, whereafter a longitudinal withdrawal of said wire strips the insulation from the lead-in portion thereof, and a stop member located intermediate said grip members and including means for interconnection thereto, said stop member receiving the lead-in portion of the wire in contact therewith to form a stop therefor, said interconnection means being responsive to the pivotal movement of the grip members to the closed position for retracting said stop member from contact with said wire so that the insulation of the wire engaged with said stop member and that has been stripped from said wire during the stripping operation is released for the disposal thereof.

4. A device as claimed in claim 3, spring means engaging said grip members and located intermediate thereof for normally urging said grip members to the open position thereof, said stop being mounted on said spring means for location in the position intermediate said grip members.

5. A device for stripping insulation from relatively small diameter electrical wire, comprising a pair of hand-held elongated grip members, a block for pivotally mounting said grip members at one end thereof, the other ends of said grip members being movable relative to each other to and from a closed stripping position, an elongated axially extending tubular guide located in said block intermediate said grip members and receiving therein in guiding relation the lead-in portion of a wire from which insulation is to be stripped, said block being formed with spaced apart portions that are located adjacent to said tubular guide and that define spaced and aligned laterally extending recesses in said block, a pair of blade members located in opposed and aligned relation in said recesses and including exposed blade elements for severing the insulation of said wire during a wire stripping operation, said blade members being disposed in said recesses adjacent to said tubular guide and in perpendicular relation to the longitudinal axis of said guide and being movable by said grip members in a straight line lateral movement in said recesses relative to the longitudinal axis of said guide upon pivotal movement of said grip members to locate said blade members in the closed stripping position, wherein said blade elements penetrate into the wire insulation, and whereafter a longitudinal retracting movement of said wire strips the insulation from the lead-in portion thereof, the pivotal end of each of said grip members having a rounded projection formed thereon, and said block having circular-like recesses formed therein for receiving said projections, wherein said grip members are pivotally mounted in said block about said projections as the axes thereof.

6. A device as claimed in claim 5, each of said grip members having a slot formed therein which includes an internally formed shoulder, the end of said blade members opposite to the exposed blade elements projecting into a slot of a grip member and being formed with an external shoulder that engages an internal shoulder of the slot, wherein pivotal movement of the grip members produces a corresponding lateral movement of said blade members.

7. A device as claimed in claim 5, said block including a base in which said recesses are formed and a cover plate removably mounted on said base for enclosing the pivotal ends of said grip members.

8. A device as claimed in claim 7, said tubular guide having a reduced portion formed thereon adjacent to the outer end thereof and being located within said block when said guide is disposed in the assembled position thereon in said block, an opening formed in said cover plate and overlying the reduced portion of said guide, and a lock member extending through said opening and into said opening for engagement with said guide for locking said guide in the assembled position in said block.

9. A device as claimed in claim 5, spring means engaging said grip members for normally urging said grip members apart to an outer pivoted position.

10. A device as claimed in claim 9, a stop engaging said spring means and being axially aligned and spaced apart relative to the inner end of said tubular guide and to said blade members, said stop being engageable by the endmost portion of the inner end of the wire to be stripped after insertion thereof through said guide for determining the length of the insulation to be stripped from said wire.

11. A device for stripping insulation from relatively small diameter electrical wire, comprising a pair of hand-held elongated grip members, a block for pivotally mounting said grip members at one end thereof, the other ends of said grip members being movable relative to each other to and from a closed stripping position, an elongated axially extending tubular guide located in said block intermediate said grip members and receiving therein in guiding relation the lead-in portion of a wire from which insulation is to be stripped, a pair of blade members located in opposed relation in said block and including exposed blade elements for severing the insulation of said wire during a wire stripping operation, said blade members being disposed in perpendicular relation to the longitudinal axis of said guide and being engageable with said grip members for lateral movement relative to the longitudinal axis of said guide upon pivotal movement of said grip members to the closed stripping position, wherein said blade elements penetrate into the wire insulation, and whereafter a longitudinal retracting movement of said wire strips the insulation from the lead-in portion thereof, the pivotal end of each of said grip members having a rounded projection formed thereon, said block having circular-like recesses formed therein for receiving said projections, wherein said grip members are pivotally mounted in said block about said projections as the axes thereof, said block including a base in which said recesses are formed and a cover plate removably mounted on said base for enclosing the pivotal ends of said grip members, said cover plate having an elongated transversely extending opening formed therein that overlies said blade members, whereby said blade members are removable from said block through said opening for replacement thereof.

12. A device for stripping insulation from relatively small diameter electrical wire, comprising a pair of hand-held elongated grip members, a block for pivotally mounting said grip members at one end thereof, the other ends of said grip members being movable relative to each other to and from a closed stripping position, an elongated axially extending tubular guide located in said block intermediate said grip members and receiving therein in guiding relation the lead-in portion of a wire from which insulation is to be stripped, a pair of blade members located in opposed relation in said block and including exposed blade elements for severing the insulation of said wire during a wire stripping operation, said blade members being disposed in perpendicular relation to the longitudinal axis of said guide and being engageable with said grip members for lateral movement relative to the longitudinal axis of said guide upon pivotal movement of said grip members to the closed stripping position, wherein said blade elements penetrate into the wire insulation, and whereafter a longitudinal retracting movement of said wire strips the insulation from the lead-in portion thereof, the pivotal end of each of said grip members having a rounded projection formed thereon, said block having circular-like recesses formed therein for receiving said projections, wherein said grip members are pivotally mounted in said block about said projections as the axes thereof, spring means engaging said grip members for normally urging said grip members apart to an outer pivoted position, a stop engaging said spring means and being axially aligned and spaced apart relative to the inner end of said tubular guide and to said blade members, said stop being engageable by the endmost portion of the inner end of the wire to be stripped after insertion thereof through said guide for determining the length of the insulation to be stripped from said wire, said spring means including a body portion to which spring arms are joined, each of said spring arms engaging a grip member, wherein said body portion is disposed intermediate said grip members, said stop being received in said body portion for location thereof relative to said guide and blade members.

13. A device as claimed in claim 12, said stop being axially movable with said body portion in a direction away from said guide and blade members upon movement of said grip members to a closing position during a stripping operation, wherein the insulation that is stripped from said wire is free to drop between said blade members and stop.

14. A device as claimed in claim 12, said stop being axially adjustable relative to said body portion to provide for adjustment of the length of the insulation to be stripped from said wire.

15. A device as claimed in claim 14, said body portion having an axial opening formed therein, said stop being received in said axial opening and means formed on said body portion for engaging said stop for locating said stop in a predetermined axial adjusted position in said axial opening.

16. A device as claimed in claim 15, said engaging means including at least one projection formed on an inner wall of said axial opening, said stop having a plurality of axially spaced notches formed therein, wherein said projection engages a notch to locate the stop in a selected position of use.

* * * * *